United States Patent
Garcia-Luna-Aceves

(10) Patent No.: US 11,770,462 B2
(45) Date of Patent: Sep. 26, 2023

(54) TECHNIQUES FOR VIRTUAL TIME SLOTTING OF COMMUNICATIONS PACKETS

(71) Applicant: The Regents of the University of California, Oakland, CA (US)

(72) Inventor: Jose Joaquin Garcia-Luna-Aceves, Santa Cruz, CA (US)

(73) Assignee: The Regents of the University of California, Oakland, CA (US)

(*) Notice: Subject to any disclaimer, the term of this patent is extended or adjusted under 35 U.S.C. 154(b) by 397 days.

(21) Appl. No.: 17/010,542

(22) Filed: Sep. 2, 2020

(65) Prior Publication Data

US 2021/0067612 A1 Mar. 4, 2021

Related U.S. Application Data

(60) Provisional application No. 62/895,242, filed on Sep. 3, 2019.

(51) Int. Cl.
*H04L 47/36* (2022.01)
*H04L 69/22* (2022.01)
(Continued)

(52) U.S. Cl.
CPC ............ *H04L 69/22* (2013.01); *H04L 43/067* (2013.01); *H04L 47/10* (2013.01); *H04L 47/36* (2013.01);
(Continued)

(58) Field of Classification Search
CPC .... H04W 74/08; H04L 12/413; H04L 45/566; H04L 65/00; H04L 67/14; H04L 12/4675;
(Continued)

(56) References Cited

U.S. PATENT DOCUMENTS

2010/0150278 A1* 6/2010 Lee ................... H04W 52/028
  455/272
2012/0108276 A1* 5/2012 Lang .................. H04L 27/0006
  455/501

(Continued)

OTHER PUBLICATIONS

Abramson, "The ALOHA System—Another Alternative for Computer Communications," Proc. Fall Joint Computer Conference '70, 1970.

(Continued)

*Primary Examiner* — Salvador E Rivas
(74) *Attorney, Agent, or Firm* — Wolter Van Dyke Davis, PLLC; Eugene J. Molinelli

(57) ABSTRACT

Techniques for transmitting data packets on a shared channel in a data communications network, include determining a time slot interval, T, based on a longest data packet to be transmitted on a shared channel in a data communications network. At a first node in the data communications network a local base time, $t_0$, is determined equal to a time at an end of receipt of a successful acknowledgement control packet on the shared channel. A local data packet is transmitted from the first node onto the shared channel at a transmit time that is an integer multiple n of T after the local base time $t_0$. The local data packet is determined to be successfully transmitted when a successful acknowledgement control packet that uniquely indicates the local data packet is received on the shared channel within the interval T of transmitting the local data packet.

19 Claims, 12 Drawing Sheets

(51) Int. Cl.

| | |
|---|---|
| *H04W 28/06* | (2009.01) |
| *H04W 72/0446* | (2023.01) |
| *H04L 47/10* | (2022.01) |
| *H04L 43/067* | (2022.01) |
| *H04L 12/46* | (2006.01) |
| *H04L 45/00* | (2022.01) |
| *H04L 65/00* | (2022.01) |

(52) U.S. Cl.
CPC ....... *H04W 28/06* (2013.01); *H04W 72/0446* (2013.01); *H04L 12/4675* (2013.01); *H04L 45/566* (2013.01); *H04L 65/00* (2013.01)

(58) Field of Classification Search
CPC ..... H04L 43/067; H04L 47/36; H04L 47/365; H04J 3/242; H04B 7/18582
See application file for complete search history.

(56) References Cited

U.S. PATENT DOCUMENTS

| | | | | |
|---|---|---|---|---|
| 2012/0314583 | A1* | 12/2012 | Hart | H04W 74/0816 |
| | | | | 370/241 |
| 2014/0050207 | A1* | 2/2014 | Kostic | H04W 52/0206 |
| | | | | 370/337 |
| 2020/0067574 | A1* | 2/2020 | Yang | H04L 5/0082 |
| 2020/0413268 | A1* | 12/2020 | Yerramalli | H04W 52/42 |
| 2021/0251007 | A1* | 8/2021 | Fang | H04W 74/0816 |
| 2022/0030564 | A1* | 1/2022 | Takano | H04W 72/23 |

OTHER PUBLICATIONS

Abramson, "The Throughput of Packet Broadcasting Channels," IEEE Transactions on Communication, Jan. 1977.
Bertsekas, et al., Data Networks, Prentice-Hall, 1992.
Choudhury, et al., "Diversity ALOHA—A Random Access Scheme for Satellite Communications," IEEE Transactions on Communications, 1983.
Chu, et al., "ALOHA and Q-Learning based Medium Access Control for Wireless Sensor Networks," Proc. IEEE ISWCS '12, 2012.
Fullmer, et al., "Solutions to Hidden Terminal Problems in Wireless Networks," Proc. ACM SIGCOMM '97, Sep. 1997.
Ghez, et al., Stability Properties of Slotted ALOHA with Multipacket Reception Capability, IEEE Transactions on Automatic Control, 1988.
Heusse, et al., "Idle Sense: An Optimal Access Method for High Throughput and Fairness in Rate Diverse Wireless LANs," Proc. ACM SIGCOMM '05, 2005.
Karn, "MACA—A New Channel Access Method for Packet Radio," Proc. ARRL/CRRL Amateur Radio 9th Computer Networking Conference, 1990.
Kissling, "Performance Enhancements for Asynchronous Random Access Protocols over Satellite," Proc. IEEE ICC '11, Jun. 2011.
Kleinrock, et al., "Packet Switching in Radio Channels: Part I—Carrier Sense Multiple-Access Modes and Their Throughput-Delay Characteristics," IEEE Trans. Commun., 1975.
Liva, "Graph-based Analysis and Optimization of Contention Resolution Diversity Slotted ALOHA," IEEE Transactions on Communication, 2011.
Paolini, et al., "High Throughput Random Access via Codes on Graphs: Coded Slotted ALOHA," Proc. IEEE ICC '11, Jun. 2011.
Roberts, "ALOHA Packet System with and without Slots and Capture," ACM SIGCOMM CCR, vol. 5 Issue 2, Apr. 1975.
Schoute, "Dynamic Frame Length ALOHA," IEEE Transactions on Communications, 1983.
Sohraby, et al., Comments on Throughput Analysis for Persistent CSMA systems, IEEE Trans. Commun. Jan. 1987; pp. 240-243.
Yan, et al., "Adaptation of the ALOHA-Q Protocol to Multi-Hop Wireless Sensor Networks," Proc. IEEE European Wireless '14, May 2014.

* cited by examiner

TECHNIQUES FOR VIRTUAL TIME SLOTTING OF COMMUNICATIONS PACKETS

CROSS-REFERENCE TO RELATED APPLICATIONS

This application claims benefit of Provisional Appln. 62/895,242, filed Sep. 3, 2019, the entire contents of which are hereby incorporated by reference as if fully set forth herein, under 35 U.S.C. § 119(e).

BACKGROUND

Networks of general-purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

In Layer 2 of a network, the Media Access Control (MAC) sublayer provides addressing and channel access control mechanisms that enable several terminals or network nodes to communicate in a network.

Some protocols pass protocol-related information among two or more network nodes in special control packets that are communicated separately; and, which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

In most wireless ad hoc networks, the nodes compete for access to shared wireless medium, often resulting in collisions (interference). Many ad hoc network nodes use half duplex transceivers, which use the same radio channel for transmitting and receiving. Such half duplex nodes cannot receive while transmitting. Thus, it is possible, and even common, due to collisions for such nodes to miss the control plane messages and headers that are designed to control the flow of packets.

Carrier-sense multiple access (CSMA) is arguably the most widely used technique for the sharing of common radio channels in ad hoc networks today, as it is an integral part of the IEEE 802.11 protocol standard. According to CSMA, a transmitter will not transmit while a channel is active, as determined by sensing the carrier radio frequency. This traditional collision avoidance handshake consists of a request-to-send (RTS) message in one or more data packets, a clear-to-send (CTS) message in one or more data packets, a variable length data message in one or more data packet, and an acknowledgment (ACK) message in one or more data packets. However, CSMA is not always suitable.

SUMMARY

It is recognized here that, in some circumstances, carrier sensing is either not possible or becomes too onerous. Examples of such circumstances are untethered networks with long propagation delays (e.g., underwater sensor networks, satellite networks and space networks), wireless networks that operate in noisy environments, or terrains in which hidden-terminal interference is prevalent, and Internet of Things (IoT) deployments consisting of very simple nodes, such as wireless sensors. These different circumstances, among others, are grouped under the term reduced radio capacity.

Techniques are provided for reducing collisions when sharing common radio channels in ad hoc networks at nodes with reduced radio capacity by virtual time slotting (VTS) of communications packets or sharing of information on channel congestion or some combination.

In a first set of embodiments, a method includes determining a time slot interval, T, based on a longest data packet to be transmitted on a shared channel in a data communications network. The method also includes determining at a first node in the data communications network a local base time, $t_0$, equal to a time at an end of receipt of a successful acknowledgement control packet on the shared channel. The method further includes transmitting a local data packet from the first node onto the shared channel at a transmit time that is an integer multiple n of T after the local base time $t_0$. The method still further includes determining that the local data packet was successfully transmitted when a successful acknowledgement control packet that uniquely indicates the local data packet is received on the shared channel within the interval T of transmitting the local data packet.

In some embodiments of the first set, the local data packet is transmitted, or not, at a current multiple i of T after the local base time $t_0$ based on a persistence probability $\varphi$. In some of these embodiments, the persistence probability $\varphi$ is based at least in part on first data in a channel utilization field in a layer 2 header received from a different second node in the data communications network. In some of these embodiments, the method also includes determining an integer multiple $v_s$ of T after the local base time $t_0$ for which the local data packet is successfully transmitted. This method also includes inserting, into the channel utilization field in the layer 2 header for a different next local data packet, second data based at least in part on $v_s$. In some of these embodiments, the second data sent in the layer 2 header is also based at least in part on the first data received in the layer 2 header.

In a second set of embodiments, a non-transitory computer-readable medium carries one or more headers for a data packet configured for transmission over a shared channel in a data communications network, wherein a layer 2 data header includes a channel utilization field that holds data that indicates congestion perceived by a first node on the data communications network. In some of these embodiments, the channel utilization field is one bit in length.

In other sets of embodiments, an apparatus or system or computer-readable medium is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Techniques are described for avoiding packet collisions on a shared communications channel under conditions of reduced radio capacity by using virtual time slotting or shared congestion information or some combination. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein, such as subranges to avoid any prior art. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of enhancing an ALOHA layer 2 protocol with virtual time slotting and a single bit field for sharing knowledge of average channel congestion, called a KALOHA protocol, using certain estimates of throughput to help choose protocol parameters, such as maximum data packet size and persistence probability. However, the invention is not limited to this context. In other embodiments, synchronized or virtual time slotting is used with more or fewer bits on the same or different data packets or control plane packets to share knowledge of average channel congestion and the same or different estimates of throughput or performance are used for choosing these or other protocol parameters.

1. Overview

Figure 1:
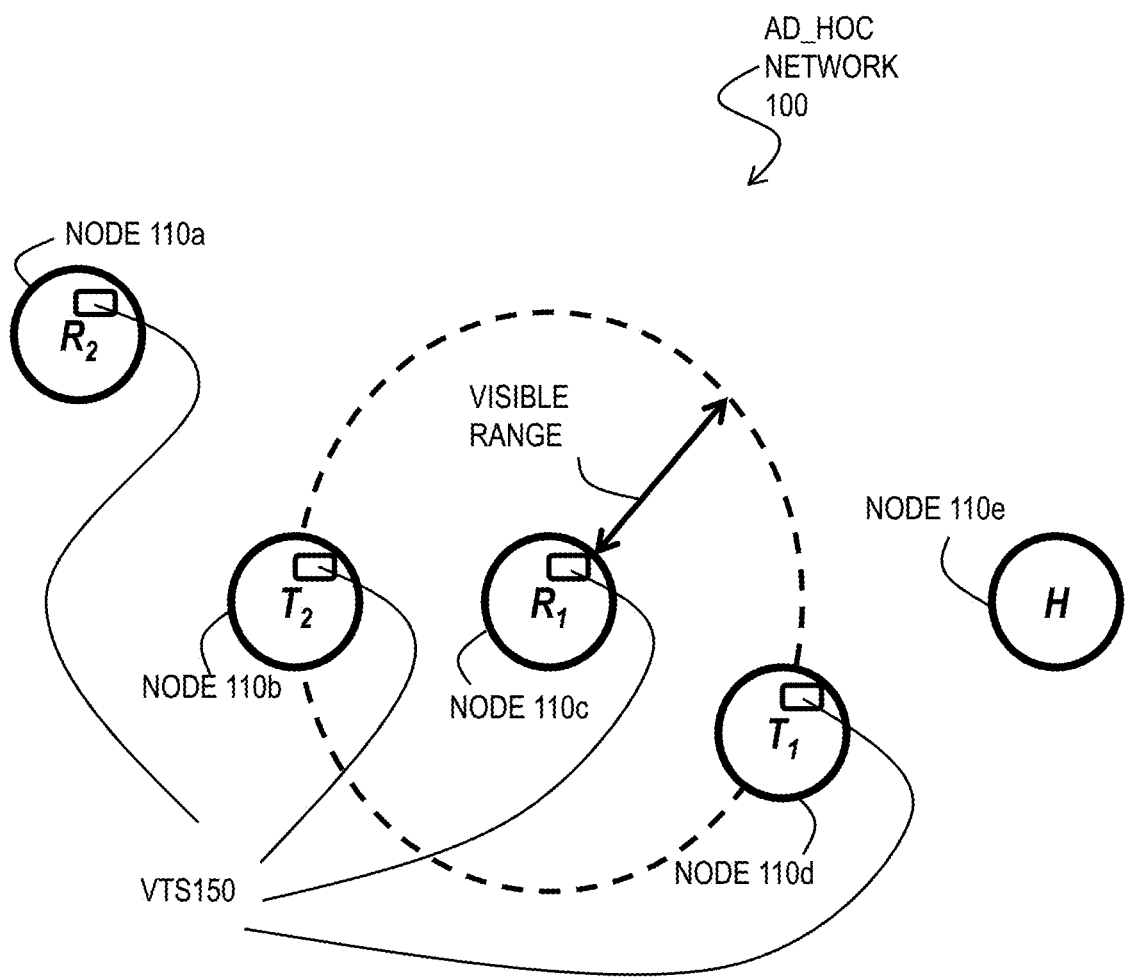
FIG. 1 is a block diagram that illustrates example nodes in an ad hoc network, according to an embodiment.

FIG. 1 is a block diagram that illustrates example nodes 110a, 110b, 110c, 110d, 110e, (collectively referenced hereinafter as nodes 110) in an ad hoc network 100, according to an embodiment. In an ad hoc network the relative positions of nodes are not fixed and the nodes can move in and out of range freely, e.g., the nodes are untethered. In the illustrated embodiment, each node 110 is in communication with one or two adjacent nodes that are within a visible range (indicated for node 110c by a dashed circle centered on node 110c); but, non-adjacent nodes (such as node 110a and node 110e compared to node 110c) are outside the visible range and are thus "hidden." The nodes 110 constitute an ad hoc network 100 in which data packets can hop, e.g., from node 110a to node 110b to node 110c to node 110d to node 110e and to any node (not shown) sharing a network (not shown) with node 110e.

To avoid collisions with data packets from adjacent and hidden nodes while transferring data packets from one node to the next, each of nodes 110a through node 110d includes a virtual time slotting (VTS) module 150 comprising hardware circuitry or software or some combination. In various embodiments, the VTS module 150 performs all or part of one or more of the methods described herein. This VTS module 150 does not rely on changes to, or interaction with, the physical layer (Layer 1) protocol or require clock synchronization or detection of idle and busy states for the shared channel. In the illustrated embodiments, multiple access interference (MAI) is reduced for variable-length data packets and acknowledgment messages in a Layer 2 protocol, even when nodes operate using simple and inexpensive half-duplex transceivers.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 2A:
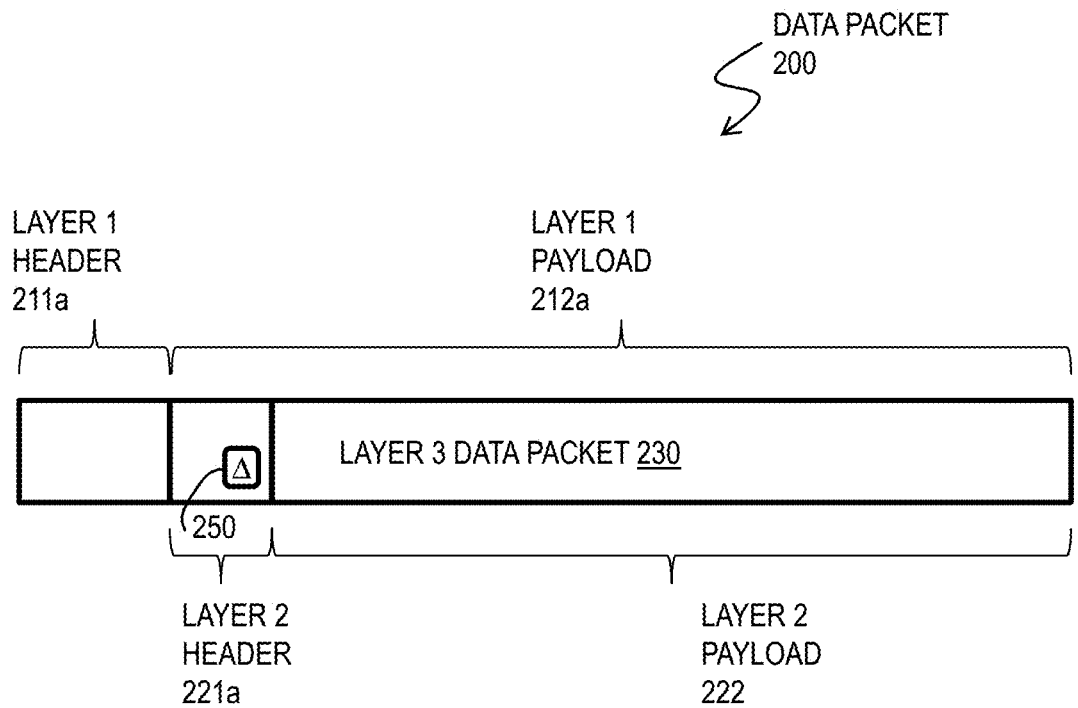
FIG. 2A and FIG. 2B are block diagrams that illustrate example data packets with layer 2 headers, according to an embodiment.
Figure 2B:
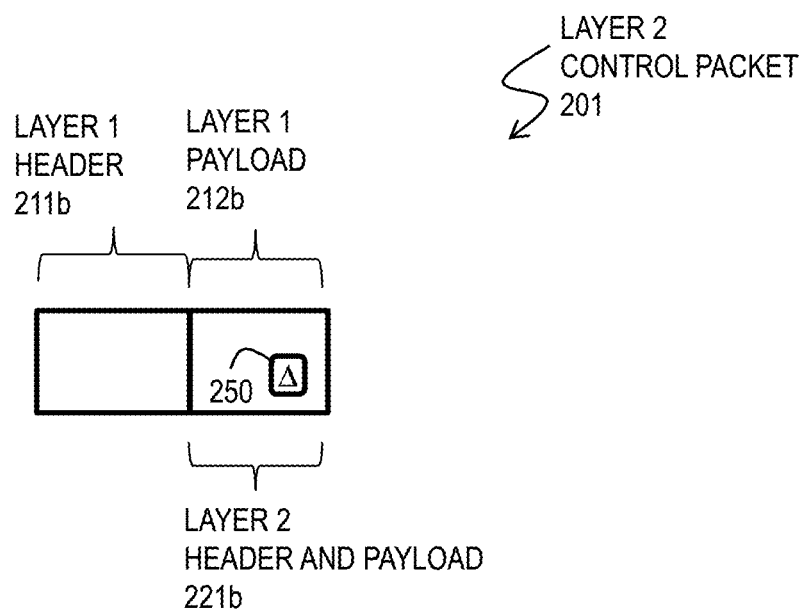

FIG. 2A and FIG. 2B are block diagrams that illustrate example packets with layer 2 headers, according to an embodiment. FIG. 2A illustrates an example data packet 200 with data provided for a Layer 3 or higher layer protocol, including an Internet protocol (IP). Such data packets 200 include a physical layer (Layer 1) header 211a made up of a series of bits that indicate values for various Layer 1 fields, and a Layer 1 payload 212a. The Layer 1 payload 212a includes a Layer 2 header 221a that is made up of a series of bits that indicate values for various Layer 2 fields, and a Layer 2 payload 222. The Layer 2 payload 222 includes a series of bits that indicate values for the various fields of the header and payload of the higher layer protocols encapsulated by the Layer 2 protocol. No further protocol needs to be illustrated to describe the various embodiments.

FIG. 2B illustrates an example control plane packet 201 for the Layer 2 protocol. As for the data packet 200, the control plane packet 201 includes a Layer 1 header 211b and Layer 1 payload 212b. However here, the Layer 1 payload only includes a header and payload for Layer 2 and no higher layer protocols. This kind of packet is used to communicate information just used by the Layer 2 protocol, such as any handshaking negotiation or acknowledgment that a data packet was successfully delivered over the shared channel, called an acknowledgement message (ACK). An ACK uniquely identifies the data packet being acknowledged, e.g., with a unique identifier in an ID field, not shown, in the Layer 2 header 221b of the control packet 201 that matches the unique identifier in the ID field, not shown, in the Layer 2 header 221a of the data packet 200.

Although data structures, messages and fields are depicted in FIG. 2A and FIG. 2B as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

An early used Layer 2 protocol was called the ALOHA protocol, as described in Abramson, 1970, which did not require carrier sensing. ALOHA served as the basis for a plethora of medium-access control (MAC) protocols, which are Layer 2 protocols, for untethered networks, which were designed and adopted over more than 50 years. Most of the later MAC protocols adopted carrier sensing that indicates the ability to listen to the channel to determine, even while transmitting, whether the channel is idle or busy. As indicated above, in many circumstances called reduced radio capacity, such carrier sensing is not available or not reliable.

In the basic ALOHA design, a node transmits whenever it has a packet to send and applies a back-off strategy after detecting that its transmission was unsuccessful, e.g., by failure to receive an ACK control plane packet within a specified time. Compared to the amount of work that has been done in the context of MAC protocols using carrier sensing, the amount of work on ALOHA improvements has been rather limited. The most notable improvement over basic ALOHA without requiring carrier sensing is slotted ALOHA, which divides time up into slot intervals, each slot interval sufficient to send the maximum allowed size data packet and receive an ACK packet. A data packet transmission is attempted only at the beginning of a slot interval. In these prior art approaches, slotted ALOHA requires clock synchronization, and control plane packet traffic to achieve synchronization. The vast majority of improvements on ALOHA assumes slotted ALOHA. In addition, some improvements based on slotted ALOHA take advantage of channel-state information. These improvements require that receivers distinguish among idle, successful and unsuccessful time slots using physical-layer mechanisms, and thus interaction with Layer 1 protocols.

In various embodiments described herein, no clock synchronization among the nodes is required; and, instead, time slotting is based on a virtual synchronization using a local base time, $t_0$, based on receipt of an ACK message. Such time slotting is called herein virtual time slotting (VTS). In other embodiments, receipt of other control plane or data packet message types are used for local base time $t_0$. An advantage of using receipt of an ACK message as local base time $t_0$, is that it indicates a successful transmission, and the time slot right after that should be available for a next data packet to be sent successfully over the shared channel. Thus, at a first node in the data communications network, a local base time, $t_0$, is determined equal to a time at an end of receipt of a successful acknowledgement control packet on the shared channel.

Time slots are of equal duration called a time slot interval T. The value of T is advantageously no shorter than the time needed for a sender and a receiver to exchange the longest allowed packet and the corresponding ACK. This leads to the conservative approach of setting T equal to the aggregate of a maximum length in bits allowed for data packet 200 divided by the bit rate, the time needed to send an ACK, one maximum round-trip travel time, and two turnaround times (one to process the data packet and one to process the ACK). Thus, a time slot interval, T, is based on a longest data packet to be transmitted on a shared channel in a data communications network. Furthermore, it is determined that the local data packet was successfully transmitted when a successful acknowledgement control packet that uniquely indicates the local data packet is received on the shared channel within the interval T of transmitting the local data packet.

In various embodiments described herein, different amounts of knowledge held by nodes accessing a common channel are used to improve the efficiency of ALOHA without any physical-layer assistance. The only physical-layer feedback involved is the performance of the basic Layer 1 function of decoding the Layer 1 payloads of successfully transmitted packets and their acknowledgments (ACK). This information is shared among the various nodes using a channel utilization field 250 in a Layer 2 header 212a or 212b, collectively referenced hereinafter as Layer 2 header 212, such as an ALOHA or MAC header. The field 250 indicates the value of a channel utilization parameter Δ. In the illustrated embodiments, the channel utilization parameter Δ indicates little/no congestion with a first value (e.g., Δ=0) and indicates high/problematic congestion with a different second value (e.g., Δ=1). In such embodiments, the field can be as short as one bit. In other embodiments, more than two different degrees of congestion are indicated by the channel utilization parameter Δ, and the field 250 includes two or more bits. In various embodiments, the amount of congestion is related to the time between ACK messages at each node, such as the number, $v_s$, of time slots between ACK messages indicating successful transmissions observed on the local node, or an effective number $v_{bar}$ of such time slots combining information from multiple successful transmission. In some of these embodiments, a threshold number, γ, separates the number of time slots between ACK messages that distinguish little congestion from high congestion. Congestion may start taking place as the average gap between successful transmissions becomes smaller and approaches 1. Any value of the threshold γ may be used; however, for better performance, analysis results indicate that a good threshold γ is on the order of 2 or 2.5, as described in more detail below.

In various embodiments, the probability of an attempt by a node to transit at the beginning of the next time slot, called the persistence probability φ, depends on the value of the channel utilization parameter Δ. The name persistence probability signifies that when φ=1, the node is persistent and attempts to transmit at the beginning of every time slot. In some embodiments, the more congestion indicated by the channel utilization parameter Δ, then the lower the probability φ of transmitting; and, the less congestion indicated by the channel utilization parameter Δ, then the higher the probability φ of transmitting. In some embodiments in which the channel utilization parameter Δ has only two values, then the persistence probability φ has only two values, 1 when Δ indicates little congestion or ρ when Δ indicates high congestion, where 0<ρ<1. In various embodiments, $\rho=1/v_s$ or $\rho=1/v_{bar}$ or some other fixed or dynamically chosen value based on learning. In any case, the attempt to transmit is only made at the beginning of a time slot which is an integer multiple, including zero, of T after base time $t_0$. Thus, a local data packet is transmitted from the first node onto the shared channel at a transmit time that is an integer multiple n of T after the local base time $t_0$.

Channel throughput can be improved by adapting the persistence probability φ used by each node based on perceived channel utilization. The only indicator of channel utilization that nodes with simple transceivers have available to them is the perceived characteristic number of virtual time slots elapsed between two successive successful transmissions, which is denoted above by $v_{bar}$. Unfortunately, $v_{bar}$ is a poor indicator of channel utilization, because large values of $v_{bar}$ may be the result of either time slots that are empty or time slots containing collisions. Not surprisingly, all prior approaches focusing on stabilizing slotted ALOHA avoid this problem by assuming that nodes can identify good, bad, and idle time slots using physical-layer mechanisms.

The method described herein overcomes the limitations of $v_{bar}$ by allowing nodes to collaborate with each other at the MAC layer (Layer 2). To the best of our knowledge, this is the first MAC protocol to do so. One embodiment described herein, sharing a parameter Δ that can only attain two values, is arguably one of the simplest implementations of shared learning of channel utilization at the MAC layer.

2. Method for Virtual Time Slotting (VTS)

Figure 3:
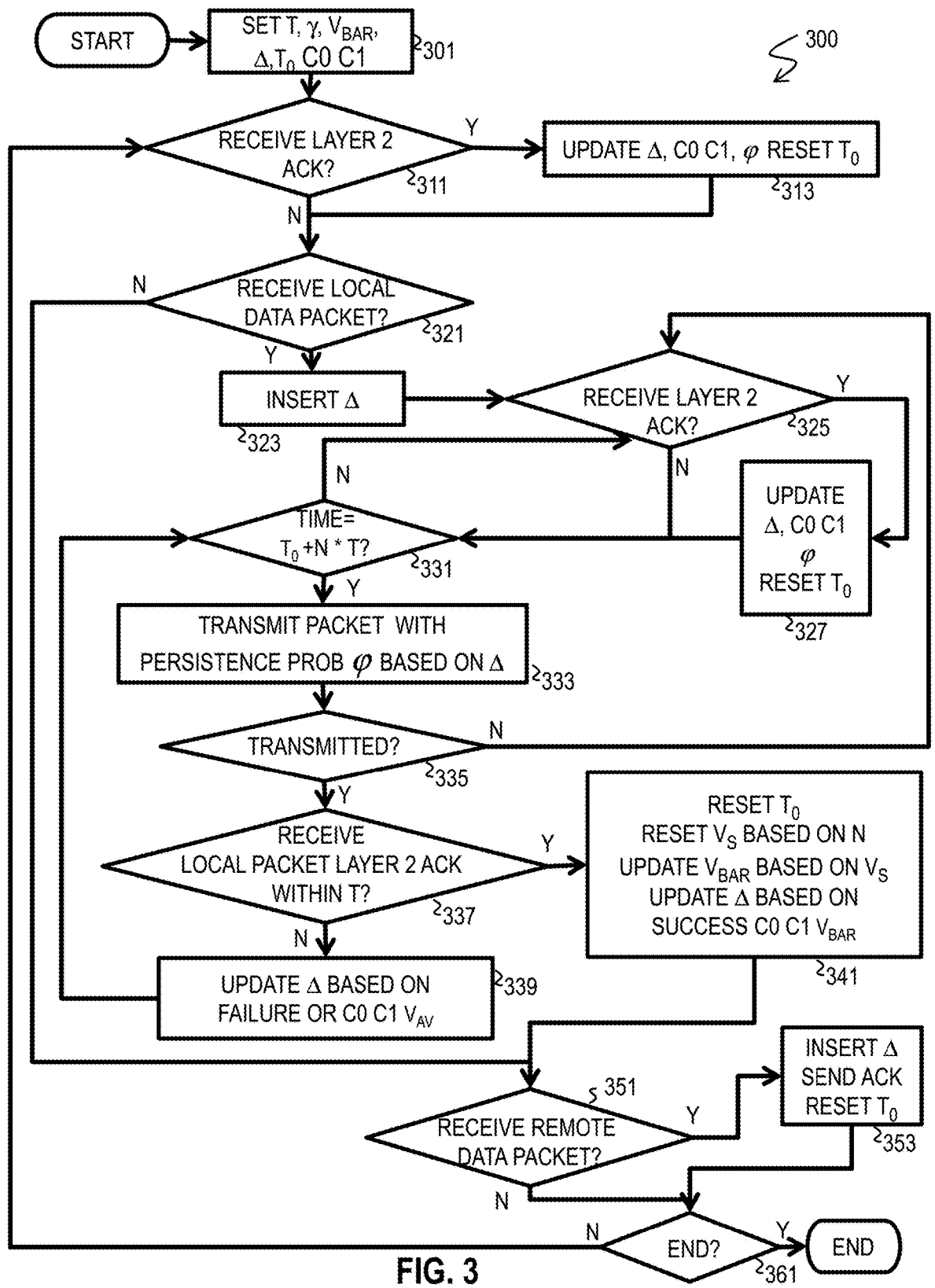
FIG. 3 is a flow chart that illustrates an example method for virtual time slotting with shared information about persistence probability, according to an embodiment.

FIG. 3 is a flow chart that illustrates an example method 300 for virtual time slotting with shared information about persistence probability, according to an embodiment. Although steps are depicted in FIG. 3 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 301, initial values are set for the method parameters, such as time slot interval T, number $v_{bar}$ of time slot intervals between ACK messages (successful transmissions) based on local information, congestion threshold number γ, persistence probability φ, reduced probability during congestion ρ, channel utilization Δ, local base time $t_0$, and channel utilization counters Ck to track the number of messages for each value of Δ, where k indicates one of k values allowed for Δ, such as 0 and 1 for the illustrated embodiment where Δ takes on one of only two values, 0 or 1. Any method may be used to set these values including manual input, retrieval from local or remote storage, or receipt in a data packet, either unsolicited or in response to a query message.

In an example embodiment, T is determined based on Equation 1.

$$T = \delta + a + 2(\omega + \tau) \qquad (1)$$

where δ is the maximum data packet length in bits divided by the bit rate of the channel, a is the length of an acknowledgment message in bits divided by the bit rate, ω is the turnaround delay incurred by a transmitter, and τ is the maximum propagation delay.

In addition, during step 301, counters Ck, and $v_{bar}$ are initially set to zero. Channel utilization parameter Δ is initialized assuming no congestion, so in the illustrated embodiment Δ=0 in step 301. The threshold number γ is on the order of 2, and for purposes of illustration is assumed to be 2.5. In some embodiments, before the first acknowledgement message is received, the local base time $t_0$ is set to the current local time maintained by node's own clock. In some embodiments, a value is selected for ρ during step 301. For example, ρ is initialized as 0.5. After initialization, the node is in a PASSIVE state, waiting for an event to change its state.

In some embodiments, the choice of values for δ, γ, k, Δ or ρ, among other parameters, are selected to optimize throughput for expected performance, using models with various degrees of approximations, as described in more detail below in a section on example embodiments.

In step 311, while in the PASSIVE state, it is determined whether a Layer 2 successful transmission acknowledgement control plane packet (ACK) is received. If not, the node remains in the PASSIVE state and control passes to step 321. In step 321, it is determined whether the node has received a local data packet to transmit. If not, the node remains in the PASSIVE state and control passes to step 351. In step 351, it is determined whether the node has received a remote data packet to acknowledge. If not, the node remains in the PASSIVE state and control passes to step 361. In step 361, it is determined if the process is to end. If so, the process ends. If not, the local node stays in the PASSIVE state and control passes back to step 311.

If it is determined in step 311, that an ACK has been received, then, in step 313, the local base time $t_0$ is reset to the current time and, as a result, the onsets of the next time slots are known. The value of the channel utilization parameter $\Delta$ indicated in field 250 is determined from the received packet, and one of the counters Ck is updated, based on that value. For example, in the illustrated embodiment, C0 is incremented by 1 if $\Delta=0$, and C1 is incremented by 1 if $\Delta=1$. Depending on the relative counts of the Ck, the value of $\Delta$ may be changed in the direction of the dominant count. For example, if the count for the more congested channel utilization dominates, the value of $\Delta$ would be increased. In an example embodiment, if $\Delta=0$, but C1>C0, then $\Delta$ would be reset to $\Delta=1$. In some embodiments, $\Delta$ is reset as indicated in Equation 2.

$$\text{If } \Delta=0 \text{ and } C1>C0+\varepsilon, \text{ then } \Delta=1, \text{ where } 1\leq\varepsilon \text{ and } \varepsilon\in Z^+ \quad (2)$$

Where $\varepsilon$ assures that there is not excessive flipping between two states of $\Delta$, and $Z^+$ is the set of positive integers. In the illustrated embodiment, $\varepsilon=1$; but, in some embodiments, it is adjusted based on a value that is experimentally found to give good performance.

The persistence probability $\varphi$ is set based on the value of $\Delta$. In an illustrated embodiment, the persistence probability $\varphi$ is set based on Equation set 3.

$$\varphi = \begin{cases} 1 & \text{if } \Delta = 0 \\ \rho & \text{if } \Delta = 1, \rho \in R^+, 0 < \rho < 1 \end{cases} \quad (3)$$

In some embodiments, $\rho$ is a constant set during initialization in step 301; and, in some embodiments, $\rho$ is a function of another parameter indicating rate of use of the channel, such as $v_s$ or $v_{bar}$. The node remains in the PASSIVE state and control passes to step 321.

If it is determined in step 321, that a local data packet 200 is ready to be transmitted, then the node is in a PERSIST state in which it will persist in attempting to send the data packet 200, and control passes to step 323. In step 323 the current value of the channel utilization parameter $\Delta$ is inserted into field 250 of the Layer 2 header 221a of a data packet to transmit. The node will wait for the next time slot, an integer multiple n of T after the current local base time $t_0$; and, attempt to transmit the data packet 200 with a persistence probability $\varphi$. While waiting, it will be determined in step 325 whether a Layer 2 acknowledgement message is received. If so, then control passes to step 327. In step 327, the local base time $t_0$ will be reset to the current time, the value for $\Delta$ will be retrieved from the field 250 in the header 221b of the acknowledgement control packet 201, the appropriate counter Ck will be incremented, the persistence probability will be updated using Equation set 3, and the new value for $\Delta$, if any, inserted into field 250 of the Layer 2 header 221a of the data packet 200. If $\Delta$ is changed, e.g., based on Equation 2, then the persistence probability is recomputed, e.g., using Equation 3.

In step 331, it is determined if the next time slot has begun, e.g., the current time is $t_0+nT$, an integer n multiple of the time slot interval T after the current value of the local base time $t_0$. If so, in step 333 the data packet 200 with its unique ID is transmitted with persistence probability $\varphi$. That is, the packet is transmitted or not based on a random draw, e.g., TRUE or FALSE, with probability $\varphi$ for TRUE. If it is determined in step 335 that the data packet 200 was not transmitted due to the random draw coming up FALSE, then the node remains in the PERSIST state, and control passes back to step 325 and 331 to await the next acknowledgement message or the start of the next time slot, respectively.

If it is determined in step 335 that the data packet was transmitted due to the random draw coming up TRUE, then the node is in a DATA state; and control passes to step 337. In step 337, it is determined whether a layer 2 ACK message that indicates the unique ID of the local data packet sent in step 333 is received within the time slot interval T of the transmission of the data packet 200. If not, then the transmission is unsuccessful; and, the node is in a BACK-OFF state and must retransmit in a later time slot. Control first passes to step 339.

In step 339, the node is in the BACK-OFF state; and, the value of $\Delta$ to be included in the next transmitted messages is recomputed to reflect the experience at the local node. For example, if $\Delta$ indicates low or no congestion, but the transmit was unsuccessful, then $\Delta$ is changed to indicate greater congestion. In the illustrated embodiment, $\Delta=0$ is changed to $\Delta=1$. The resulting persistence probability $\varphi$ is also updated based on the new value of $\Delta$ and Equation set 3. If $\Delta$ was already equal to 1, no change is made to the value of $\Delta$ or persistence probability $\varphi$. Control then passes back to step 331 or 325 to wait for the next time slot or ACK, respectively.

If it is determined, in step 337, that the ACK is received for the unique ID of the transmitted local data packet 200 within T of the transmission start time, then the node returns to the PASSIVE state and control passes to step 341. In step 341, the difference between $t_0$ and the current time indicates the time between successful transmissions. Dividing this time by the time slot interval T, gives the number $v_s$ of time slots observed locally between successful transmissions. Then, $t_0$ is reset to the current time, because the ACK message was received.

The information about $v_s$ is used to update an amalgam of such observations designated $v_{bar}$ and given by Equation 4.

$$v_{bar}=\alpha v_s+(1-\alpha) v_{bar} \quad (4)$$

where $\alpha$ is a parameter used to assign more or less weight to the latest sample $v_s$. The value of $v_{bar}$ is compared to the threshold $\gamma$. If $v_{bar}$ is changing from greater than $\gamma$ to less than $\gamma$, then the channel utilization is changing from less congested to more congested. Likewise, if $v_{bar}$ is changing from less than $\gamma$ to more than $\gamma$, then the channel utilization is changing from more congested to less congested. Thus, the value of $\Delta$ may change. In an illustrated embodiment with two values for $\Delta$, the change is given by Equation 5.

$$\text{If } \Delta=1 \text{ and } v_{bar}\geq\gamma \text{ and } C1\leq C0+\varepsilon, \text{ then } \Delta=0 \quad (5)$$

This value of $\Delta$, when included in a field 250 in a Layer 2 header 221, informs other nodes that the local node perceives channel congestion subsiding. The local node returns to the PASSIVE state; and, control then passes to step 351.

If it is determined in step 351 that a remote data packet is received that is not directed to the local node, then the local node enters a REMOTE state; and, control passes to step 353. In step 353, the local node prepares and sends a Layer 2 control packet 201 indicating acknowledgement that a data packet was received. In preparing the ACK message, the current value of Δ is inserted into field 250 Layer 2 header and payload 221b. The ACK message is sent onto the shared channel within the same time slot. The local node then re-enters the PASSIVE state; and $t_0$ is reset to the current time. If the remote data packet is not directed to the local node, then in step 353 the local node simply waits for the ACK from the target node and then resets $t_0$. Control then passes to step 361 to determine if the process ends, e.g., the local node is powering down or otherwise being removed from the network. If so, the process ends. Otherwise control passes back to step 311 to repeat the process.

3. Example Embodiments

An example embodiment of the method 300 of FIG. 3 has been implemented and called the KALOHA protocol and is described in more detail in this section.

3.1 State Machine

Figure 4:
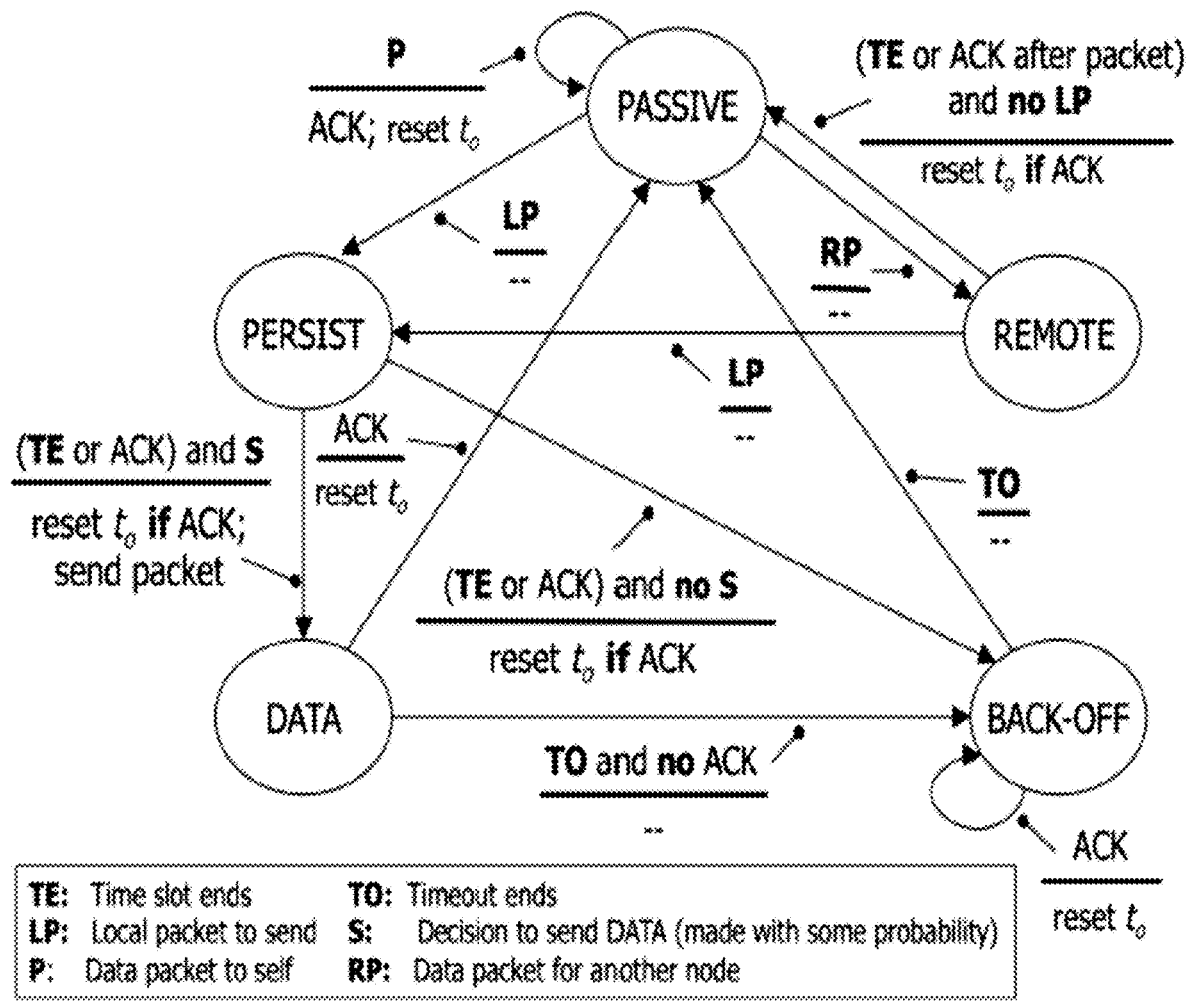
FIG. 4 is a state machine diagram that illustrates an example protocol for virtual time slotting with shared information affecting persistence probability, according to an embodiment.

FIG. 4 is a state machine diagram that illustrates an example protocol for virtual time slotting with shared information affecting persistence probability, according to an embodiment. The depicted state machine can be applied to different instantiations of a protocol based on the method 300 of FIG. 3. Each node keeps track of the last time when a successful data packet and its ACK were transmitted; and, resets the value of $t_0$ to equal its local current time when this occurs. Given the value of $t_0$, every node organizes its access to the common channel based on virtual time slots of duration T seconds each. KALOHA operates in a way similar to slotted ALOHA because each node with a packet to send delays its transmission for up to T seconds after a failure if the next virtual slot is used. The values of the persistence probability φ are either constants or maintained separately from the state machine shown in FIG. 4 to randomize the virtual slot selected based on congestion.

A node is initialized in the PASSIVE state and waits for a local data packet or a remote data packet. If a node in the PASSIVE state receives a data packet for itself correctly, it sends an ACK to the sender and resets $t_0$ to equal the current time in order to reflect the new time of origin (local base time) for its virtual time slots. If the node receives a local packet to send, it transitions to the PERSIST state. A node in the PASSIVE state that decodes a data packet for another node transitions to the REMOTE state to allow enough time to take place for a complete handshake (transmit and associated ACK) between a remote sender and a receiver.

A node transitions from REMOTE to PERSIST if it receives a local data packet to send. On the other hand, a node in the REMOTE state transitions to the PASSIVE state if it has no local packet to send when it receives an ACK or the current virtual time slot ends. The node resets the value of $t_0$ before transitioning to the PASSIVE state if it receives an ACK.

A node in the PERSIST state waits until it either receives an ACK or the current virtual time slot ends. The node transmits its data packet at the beginning of the next virtual time slot with a persistence probability φ whose value depends on the type of event that occurred during the virtual time slot. The node transitions to the DATA state after it decides to transmit its data packet, and transitions to the BACK-OFF state otherwise. In either case, the node resets the value of $t_0$ if it received an ACK during the current virtual time slot.

A node in the DATA state, which receives the ACK it is waiting for, transitions to the PASSIVE state after resetting the value of $t_0$. On the other hand, the node transitions to the BACK-OFF state if it does not receive an ACK during the remainder of the time slot (also called an ACK timeout period). A node in the BACK-OFF state computes a random back-off time (e.g., determines the integer multiple n based on φ and multiplies that by the time slot interval T) after which it transitions to the PASSIVE state and attempts to transmit as needed, and resets $t_0$ after receiving an ACK while in the BACK-OFF state.

3.2 Example Timeline

Figure 5:
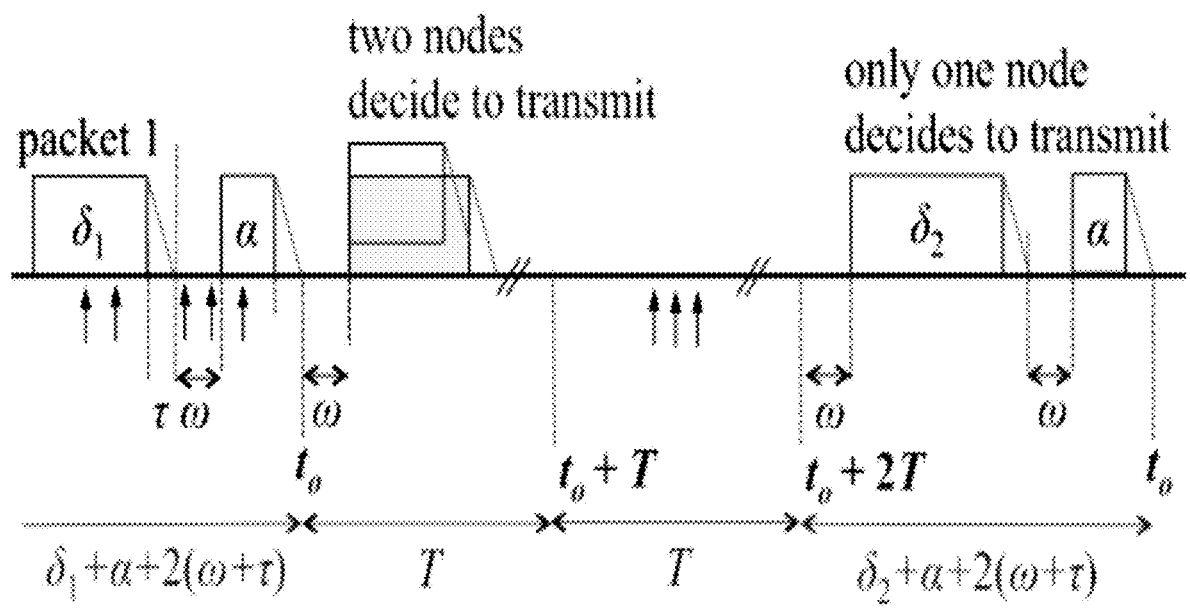
FIG. 5 is a block diagram that illustrates an example timeline for virtual time slotting, according to an embodiment.

FIG. 5 is a block diagram that illustrates an example timeline for virtual time slotting, according to an embodiment. The first transmission period in the example is a successful exchange of packet 1 of duration $\delta_1$ whose receipt is acknowledged after time τ+ω by ACK control packet a, after which each node sets it local base time $t_0$. It is assumed that five nodes sharing the channel receive local packets to send. As the figure shows, only two nodes among those five nodes decide to transmit their packets, based on their persistence probabilities φ, at the beginning of the next virtual time slot which starts when nodes receive the ACK message a of the successful exchange. Because of the collision, the transmission is not successful and no ACK message is sent; and $t_0$ is not reset. No nodes have packets to send during the second virtual time slot, so no ACK message is sent and $t_0$ is not reset. Three nodes have packets to send during the third virtual time slot, but, based on φ, only one node chooses to transmit its data packet of duration $\delta_2$; and this results in a successful transmission period that starts at time $t_0+2T$ according to the local clock of each node. All nodes reset $t_0$ after receiving the ACK message a during the last virtual time slot shown in FIG. 5.

3.3 Performance Improvements

In some embodiments, some simplifying assumptions are made in order to facilitate simulation performance and comparing the performance to that formerly simulated for a prior art, non-CSMA layer 2 protocol called ALOHA. One assumption is that there is a large number of stations that constitute a Poisson source, sending data packets to the channel with an aggregate mean generation rate of λ packets per unit time. Based on those assumptions the throughput S of KALOHA as a function of the duration T of virtual time slots and the persistence strategies including the determination of φ used by nodes can be determined. Throughput S of the network is defined to be the percentage of time in an average cycle that the channel is used to transmit data successfully.

The throughput of KALOHA with implicit ACKs and equal persistence probability φ after every time slot is estimated by Equation 6. The derivation of this equation is provided in the provisional application, earlier incorporated by reference. The actual performance improvement provided by the method is not dependent on the completeness or accuracy of that derivation that is merely provided to estimate performance for simulations.

$$S = \varphi \lambda T e^{-\varphi \lambda T} \quad (6)$$

The throughput of KALOHA with implicit ACKs, a persistence probability of 1 after a successful trans-mission, and a persistence probability of ρ after a virtual time slot without a successful transmission is estimated by Equation 7. Again, the derivation of this equation is provided in the provisional application, earlier incorporated by reference. The actual performance improvement provided by the method is not dependent on the completeness or accuracy of that derivation that is merely provided to estimate performance for simulations.

$$S = \frac{\rho\lambda T e^{-\rho\lambda T}}{1+\lambda T(\rho e^{-\rho\lambda T} - e^{-\lambda T})} \quad (7)$$

The throughput of KALOHA with explicit ACKs, so that T is given by Equation 1, is estimated by Equation 8.

$$S=(\delta/T)S^* \quad (8)$$

where S* indicates throughput with implicit ACKs, as given in Equation 6 or Equation 7. Again, the derivation of this equation is provided in the provisional application, earlier incorporated by reference. The actual performance improvement provided by the method is not dependent on the completeness or accuracy of that derivation that is merely provided to estimate performance for simulations To analyze the performance of $\varphi$ as dependent on $\Delta$, it is assumed that $\Delta$ is changed from 0 to 1 when $v_{bar} < \gamma$ with $\gamma$ slightly larger than 2. This choice is made because the minimum gap between two successful packets while $\Delta=0$ would be one empty time slot, which means $v_{bar}=2$. With nodes using $\varphi=1$ while $\Delta=0$, assuming $\gamma=2.25$ corresponds to an average idle period $I_{bar}$ of length 1.25. Because arrivals are Poisson in this model, it follows that $I_{bar}=1/(1-e^{-\lambda T})$. Thus, $\lambda T \approx 1.6$ when $I_{bar}=1.25$, and nodes must set $\Delta=1$ if $\lambda T$ continues to increase beyond that value. With these considerations, Equation 9 is used to approximate the values of $\varphi$ in Equation 3 for different values of $\lambda$. The resulting approximated values are used to obtain numerical results for comparative purposes.

$$\varphi(\lambda) = \begin{cases} 1 & \text{if } \lambda T \le 1.6 \\ \rho & \text{if } \lambda T > 1.6 \end{cases} \quad (9)$$

The numerical results presented in the next figures are normalized to the length of a data packet by making $\delta=1$ (or $T=1$). The offered load, G, which is the number of packets in a queue ready to be transmitted, is thus $G=\lambda \times \delta$ or $(\lambda \times T)$, depending on the scenario being discussed. Other parameters are normalized by their ratio with $\delta$ (or T). When explicit ACKs are considered, it is assumed that each data packet has 1500 bytes, ACKs consist of 40 bytes, and a normalized propagation delay is $a=1\times 10^{-4}$.

Figure 6:
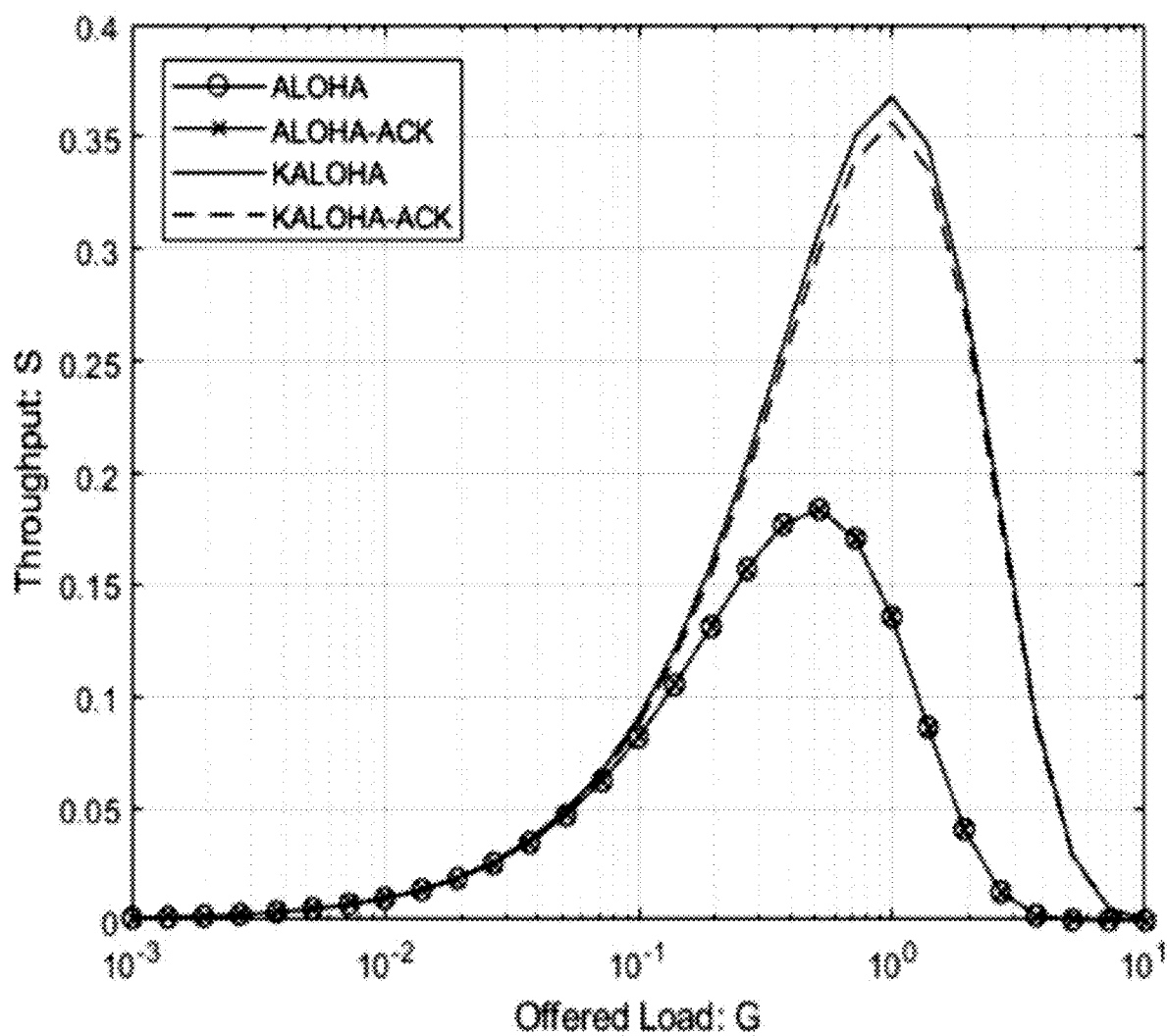
FIG. 6 is a plot that illustrates example signaling overhead for prior art ALOHA layer 2 compared to virtual time slotting with aggressive persistence, according to an embodiment.

FIG. 6 is a plot that illustrates example signaling overhead for prior art ALOHA layer 2 compared to virtual time slotting with aggressive persistence, according to an embodiment. The horizontal axis indicates offered load, G, which is dimensionless; and, the vertical axis indicates throughput in percent of time channel is active, also dimensionless. The various traces are labeled by symbols.

As is typical in such plots, the channel is underutilized when few packets are in the queue and utilization increases as more packets queue up. A maximum throughput is reached when the queue reaches a medium size. Above that, the number of packets to be transmitted lead to more collisions and the throughput decreases until at some large number of offered load G the channel suffers so many collisions that successful transmissions almost never occur.

The prior art ALOHA protocol is represented by a trace labeled with open circles for implicit ACKS and a trace labeled with x for explicit ACKS. ALOHA performance is modeled using an equation derived in the provisional application; and is not repeated here. Signaling overhead is the difference between throughput with implicit ACKs and throughput with explicit ACKs. As can be seen, that difference (signaling overhead) is negligible for ALOHA. For KALOHA it is assumed that the persistence probability $\varphi=1$ for all utilization values, i.e., $\rho=1$, which renders the same throughput results for the two persistence strategies in order to emphasize the signaling overhead. This embodiment of KALOHA is represented by a solid line trace for implicit ACKS and a dashed line trace for explicit ACKs. As can be seen, that difference (signaling overhead) is also small for KALOHA, which justifies the decision to ignore explicit ACKS when comparing ALOHA and KALOHA.

The results also show a faster rise and greater maximum throughput for somewhat longer queues for KALOHA compared to ALOHA. This result indicates that small errors incurred by nodes in determining the start of virtual time slots do not result in large differences in the performance of KALOHA, especially given that the maximum expected discrepancy on the start of a virtual time slot between two nodes is in the order of a maximum propagation delay.

It is expected that the performance of KALOHA with variable-length data packets is worse than the result shown in FIG. 6. Given that the throughput of KALOHA is proportional to the ratio $\delta/T$, its performance with variable-length data packets would be reduced by as much as $\delta-\delta_{min}$, where $\delta_{min}$ is the length of smallest data packets. However, this is a major improvement over the corresponding degradation in ALOHA resulting from variable-length packets. Abramson showed that the throughput of ALOHA with variable-length packets is far below $Ge^{-2G}$ shown as the open circle trace in FIG. 6.

Figure 7:
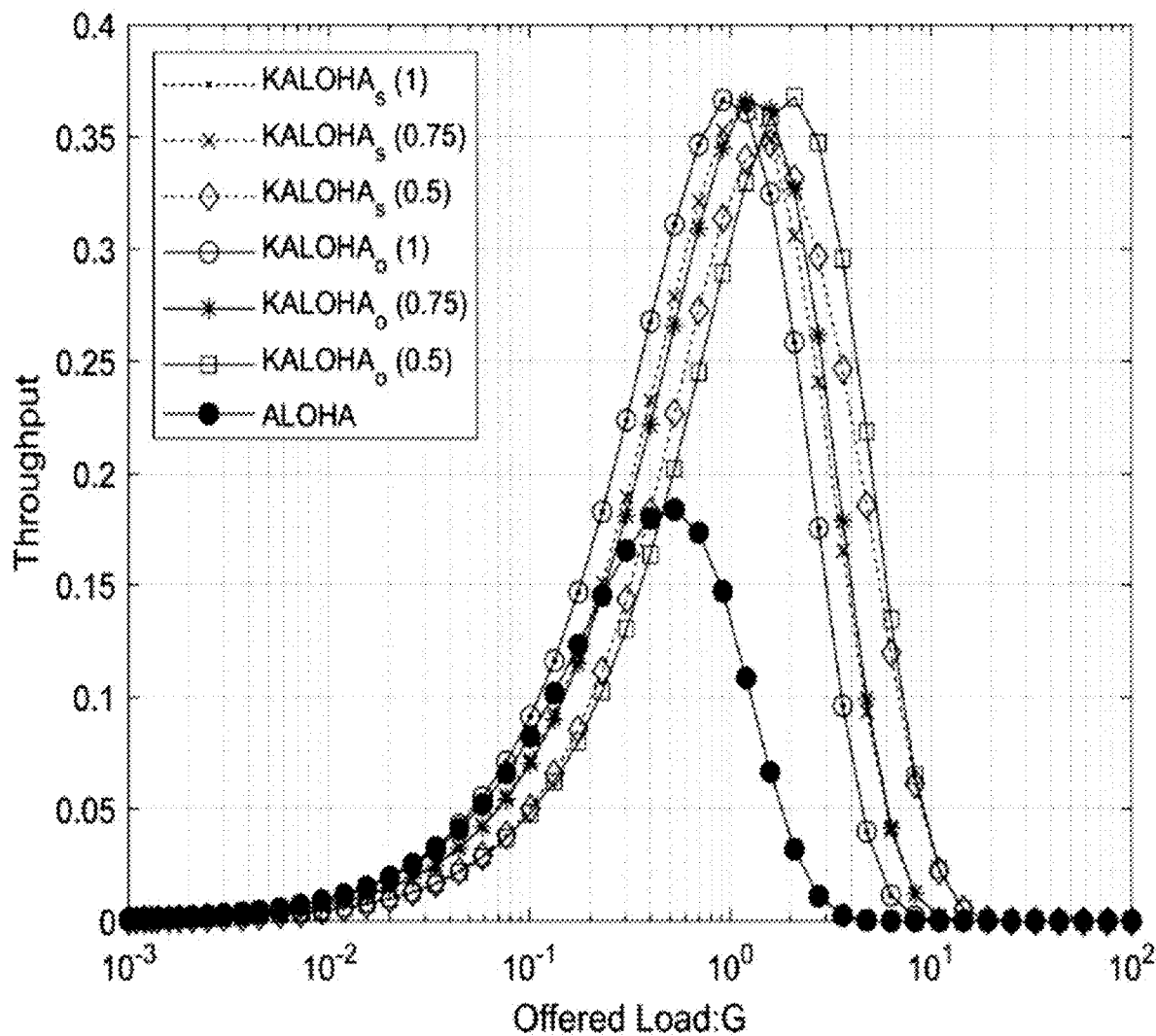
FIG. 7 is a plot that illustrates example throughput for prior art ALOHA layer 2 compared to virtual time slotting with less aggressive but fixed persistence, according to an embodiment.

FIG. 7 is a plot that illustrates example throughput for prior art ALOHA layer 2 compared to virtual time slotting with less aggressive but fixed persistence, according to an embodiment. The horizontal axis indicates offered load, G, which is dimensionless; and, the vertical axis indicates throughput in percent of time channel is active, also dimensionless. The various traces are labeled by symbols. Implicit ACKs are used and fixed values of $\varphi$ are used in KALOHA. This is done to focus on the effect that simple amounts of knowledge have on performance.

$KALOHA_o(\rho)$ are solid line traces that refer to KALOHA with the same $\varphi=\rho$ being used after every virtual time slot. An open circle label solid trace indicates $\rho=1$, an asterisk label solid trace indicates $\rho=0.75$ and an open square label solid trace indicates $\rho=0.5$. $KALOHA_s(\rho)$ dashed line traces refer to KALOHA with $\varphi=1$ after a successful packet is received and $\varphi=\rho$ when a virtual time slot occurs without a successful packet. An unlabeled dashed trace indicates $\rho=1$ (and is equivalent to the open circle solid trace), an x label dashed trace indicates $\rho=0.75$ and an open diamond label dashed trace indicates $\rho=0.5$. The well-known throughput result of $Ge^{-2G}$ for ALOHA is plotted as a solid line solid filled circle for comparison.

The results show that using $\varphi=1$ is the best policy for KALOHA if $\varphi$ is a constant, and results in the same performance of slotted ALOHA, which can be viewed as the 1-persistent version of KALOHA. Using the value $\varphi=1$ results in the maximum attainable throughput and also results in higher throughput at light to moderate traffic loads, which are the expected operating condition. It is also noted that KALOHA performs much better than ALOHA for different values of $\varphi$. However, small values of $\varphi$ lead to channel underutilization at light loads compared to ALOHA.

Figure 8:
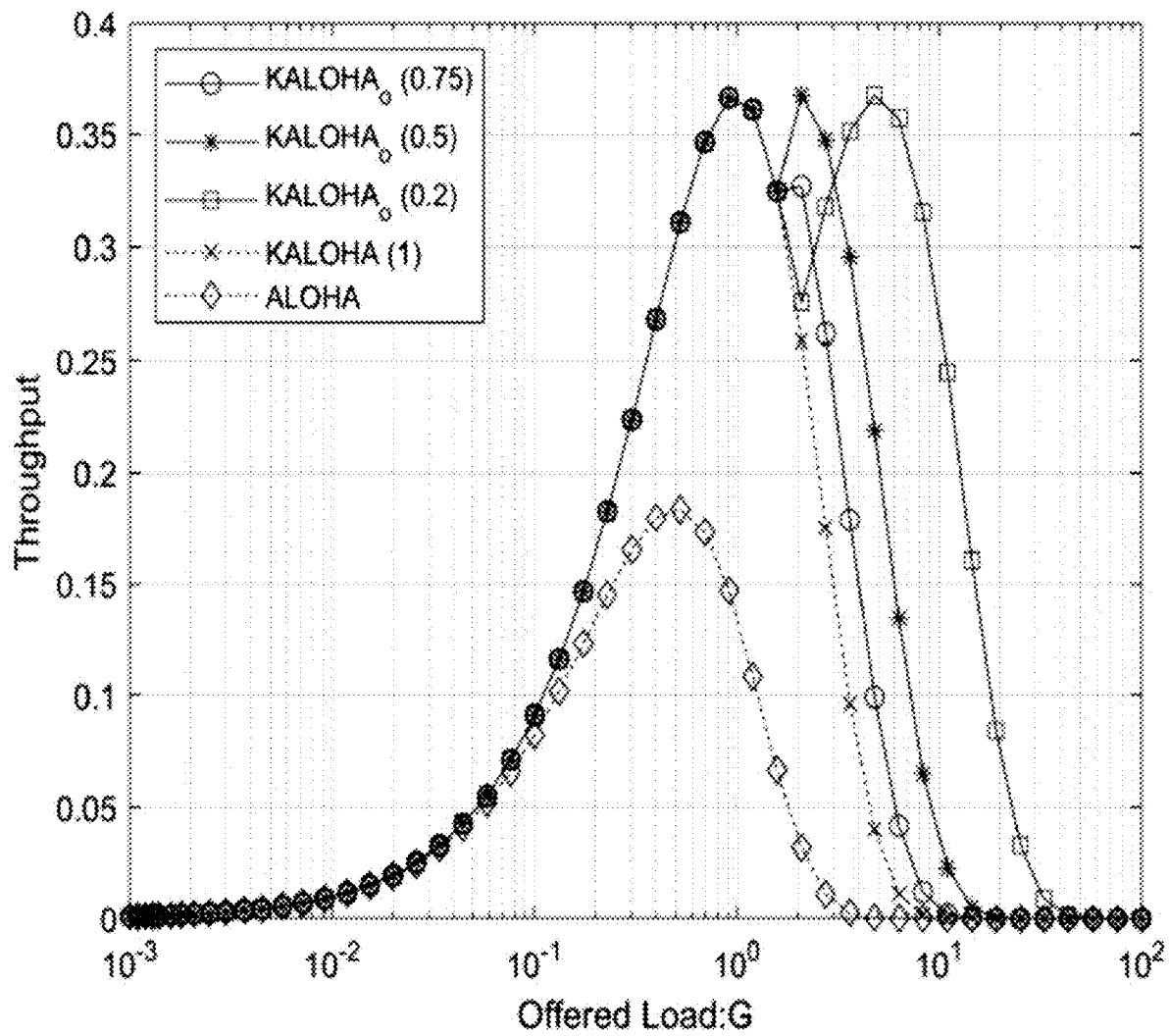
FIG. 8 is a plot that illustrates example throughput for prior art ALOHA layer 2 compared to virtual time slotting with adaptive persistence, according to an embodiment.
Figure 9:
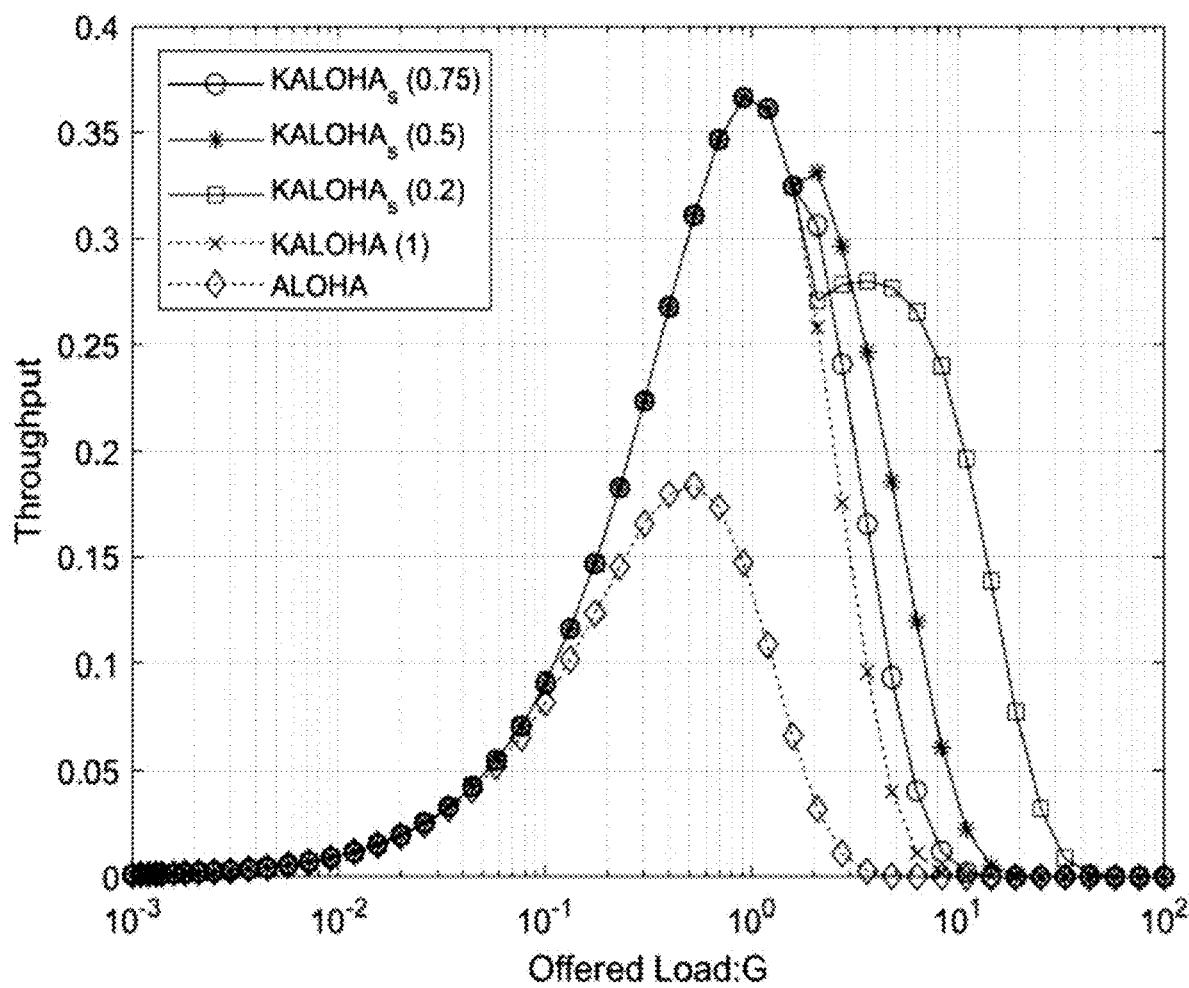
FIG. 9 is a plot that illustrates example throughput for prior art ALOHA layer 2 compared to virtual time slotting with adaptive persistence after un-successful time slots but aggressive persistence after successful time slots, according to an embodiment.

FIG. 8 is a plot that illustrates example throughput for prior art ALOHA layer 2 compared to virtual time slotting with adaptive persistence, according to an embodiment. FIG. 9 is a plot that illustrates example throughput for prior art ALOHA layer 2 compared to virtual time slotting with adaptive persistence after un-successful time slots but aggressive persistence after successful time slots, according to an embodiment. In each, the horizontal axis indicates offered load, G, which is dimensionless; and, the vertical axis indicates throughput in percent of time channel is active, also dimensionless. The various traces are labeled by symbols.

The results for KALOHA in these figures approximate the values of $\varphi$ given by Equation 3 using the values of $\varphi$ given by Equation 9. KALOHA(1) is a dashed line trace labeled by x in both figures and corresponds to setting $\varphi=1$. Both figures show results for different constant values of $\rho$, the persistence probability used by nodes after they perceive channel congestion. In both figures: KALOHA$_o$($\rho=0.75$) is a solid line trace labeled with open circles; KALOHA$_o$ ($\rho=0.50$) is a solid line trace labeled with asterisks; and KALOHA$_o$($\rho=0.20$) is a solid line trace labeled with open squares. FIG. 8 shows the results when the same adaptive persistence probability (1 or $\rho$, depending on channel congestion) is used after any virtual time slot; and, FIG. 9 shows the results when a persistence probability of 1 is always used after a successful packet and $\varphi=\rho$ is used after a virtual time slot without a success. ALOHA is a dashed trace labeled with open diamonds in both figures, provided for comparison.

Even though the results in FIG. 8 and FIG. 9 are based on approximated values of $\varphi$, they show that shared learning of channel utilization at the MAC layer can help increase the efficiency and stability of KALOHA, which satisfies selection of persistence strategy. It is also apparent from the results that using a constant value for $\rho$ is suboptimal and that defining $\rho$ as a function whose value decreases as the level of channel congestion increases would be preferable. In practice, however, using a constant value for $\rho$ still produces good results, because it reduces the rate at which nodes submit packets when the channel is congested.

Thus, even when a single bit is added to transmitted packets to indicate whether or not congestion is perceived by a node, sharing knowledge renders substantial performance benefits. Here, a simple Markov-chain model was used to compare the performance of KALOHA with ALOHA. In other embodiments, the same or other models are developed or used to help determine strategy for the setting of values for the same or other various parameters described herein.

Deriving other ways to accomplish shared learning of channel utilization at the MAC layer holds great promise and is anticipated for some embodiments. It is clear from these results that substantial improvements can be attained over existing MAC protocols without the need to rely on additional physical-layer assistance. Furthermore, the general MAC-layer approach introduced here to make persistence probabilities functions of channel utilization can be applied to MAC protocols other than ALOHA that take advantage of physical-layer mechanisms to detect idle periods, such as those MAC protocols based on carrier sensing or collision avoidance.

4. Computational Hardware Overview

Figure 10:
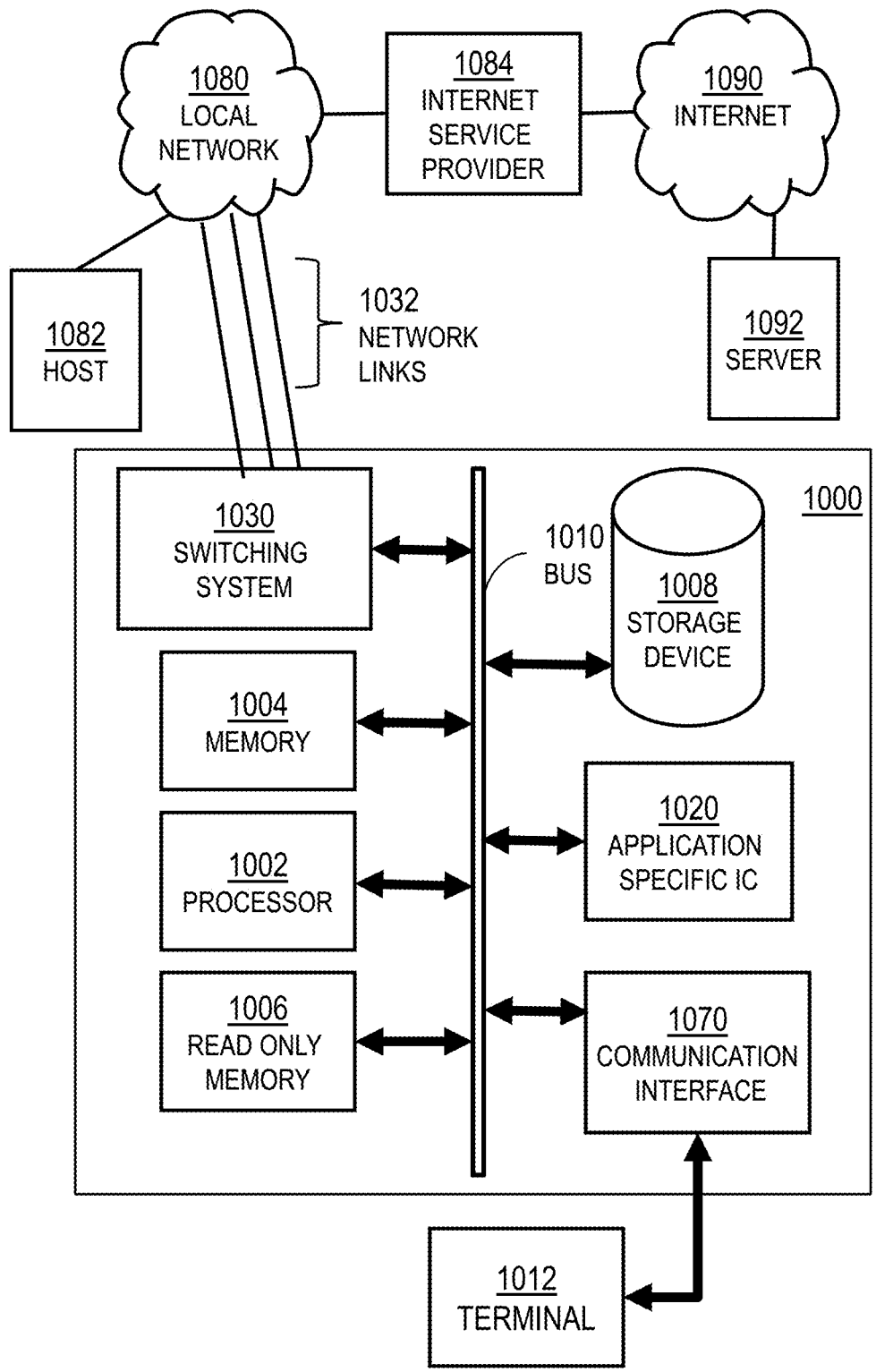
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk, optical disk, solid-state storage or FLASH-EPROM, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 1000 includes switching system 1030 as special purpose hardware for switching information flow over a network. Switching system 1030 typically includes multiple communications interfaces, such as communications interface 1070, for coupling to multiple other devices. In general, each coupling is with a network link 1032 that is connected to another device in or attached to a network, such as local network 1080 in the illustrated embodiment, to which a variety of external devices with their own processors are connected. In some embodiments an input interface or an output interface or both are linked to each of one or more external network elements. Although three network links 1032a, 1032b, 1032c are included in network links 1032 in the illustrated embodiment, in other embodiments, more or fewer links are connected to switching system 1030. Network links 1032 typically provides information communication through one or more networks to other devices that use or process the information. For example, network link 1032b may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides routing information for use with switching system 1030.

The switching system 1030 includes logic and circuitry configured to perform switching functions associated with passing information among elements of network 1080, including passing information received along one network link, e.g. 1032a, as output on the same or different network link, e.g., 1032c. The switching system 1030 switches information traffic arriving on an input interface to an output interface according to pre-determined protocols and conventions that are well known. In some embodiments, switching system 1030 includes its own processor and memory to perform some of the switching functions in software. In some embodiments, switching system 1030 relies on processor 1002, memory 1004, ROM 1006, storage 1008, or some combination, to perform one or more switching functions in software. For example, switching system 1030, in cooperation with processor 1004 implementing a particular protocol, can determine a destination of a packet of data arriving on input interface on link 1032a and send it to the correct destination using output interface on link 1032c. The destinations may include host 1082, server 1092, other terminal devices connected to local network 1080 or Internet 1090, or other routing and switching devices in local network 1080 or Internet 1090.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1032 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. As another example, communications interface 1070 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1032 and other networks through communications interface 1070, carry information to and from computer system 1000. Computer system 1000 can send and receive information, including program code, through the networks 1080, 1090 among others, through network link 1032 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1032. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
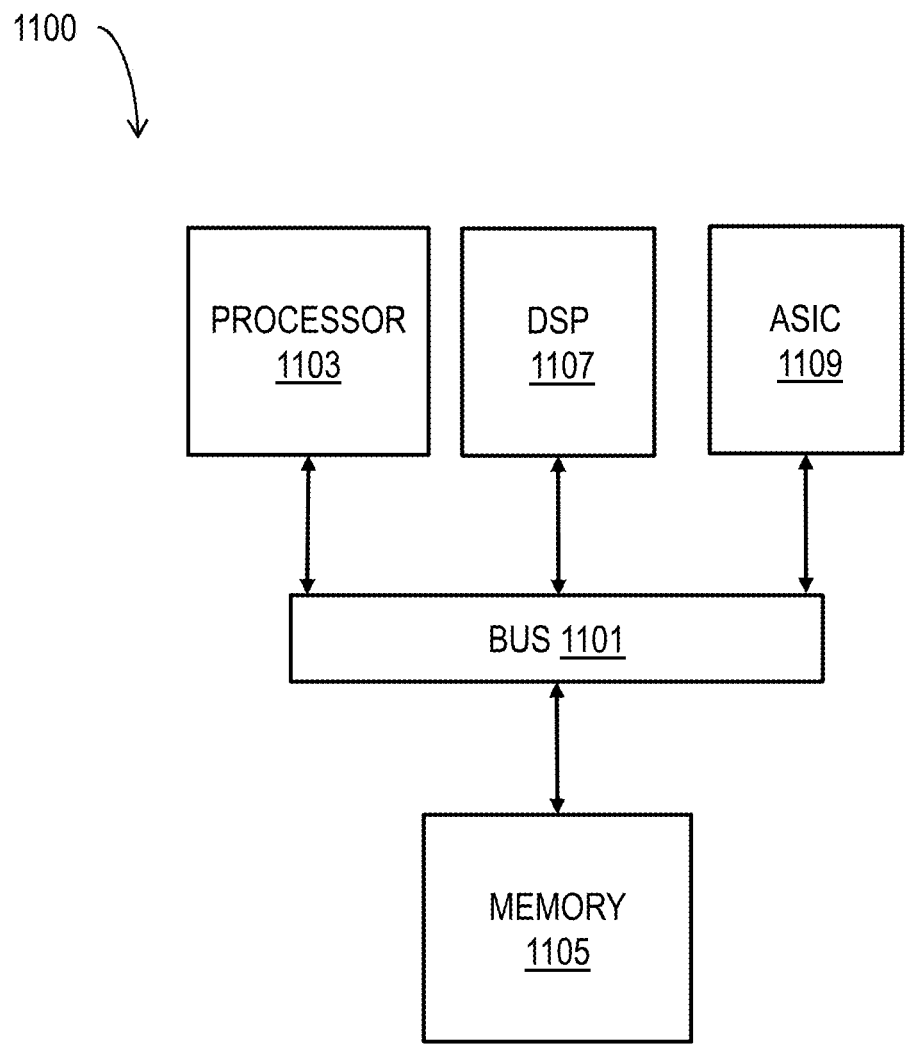
FIG. 11 illustrates a chip set upon which an embodiment of the invention may be implemented.

FIG. 11 illustrates a chip set 1100 upon which an embodiment of the invention may be implemented. Chip set 1100 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

Figure 12:
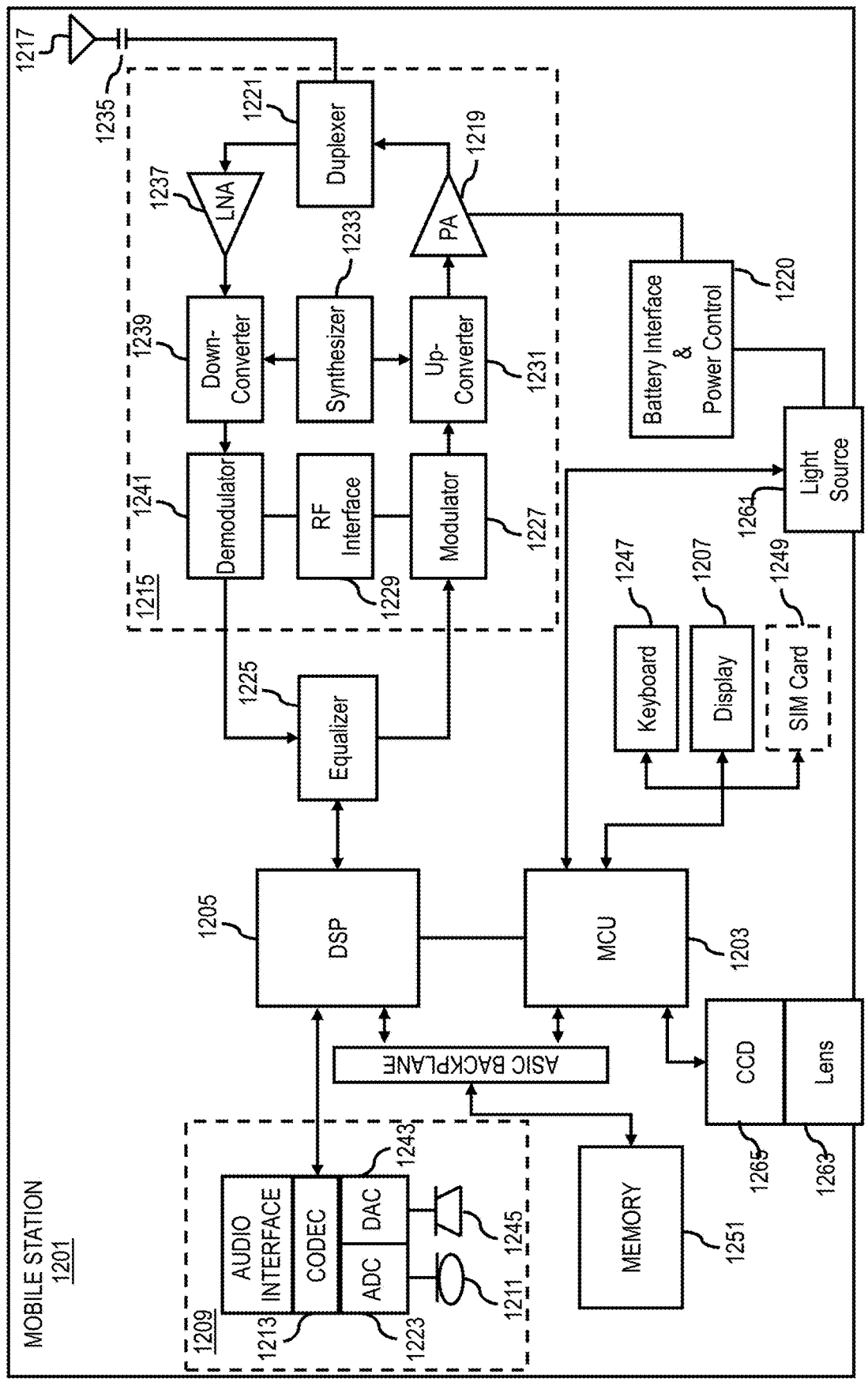
FIG. 12 is a diagram of exemplary components of a mobile terminal (e.g., cell phone handset) for communications, which is capable of operating in the system of FIG. 1, according to one embodiment.

FIG. 12 is a diagram of exemplary components of a mobile terminal 1200 (e.g., cell phone handset) for communications, which is capable of operating in the system of FIG. 2C, according to one embodiment. In some embodiments, mobile terminal 1201, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps as described herein. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 as described herein. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

In some embodiments, the mobile terminal 1201 includes a digital camera comprising an array of optical detectors, such as charge coupled device (CCD) array 1265. The output of the array is image data that is transferred to the MCU for further processing or storage in the memory 1251 or both. In the illustrated embodiment, the light impinges on the optical array through a lens 1263, such as a pin-hole lens or a material lens made of an optical grade glass or plastic material. In the illustrated embodiment, the mobile terminal 1201 includes a light source 1261, such as a LED to illuminate a subject for capture by the optical array, e.g., CCD 1265. The light source is powered by the battery interface and power control module 1220 and controlled by the MCU 1203 based on instructions stored or loaded into the MCU 1203.

5. Alternatives, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

6. REFERENCES

Each of the following references is hereby incorporated by reference as if fully set forth herein, except for terminology that is inconsistent with that sued herein.
[1] N. Abramson, "The ALOHA System—Another Alternative for Computer Communications," Proc. Fall Joint Computer Conference '70, 1970.
[2] N. Abramson, "The Throughput of Packet Broadcasting Channels," IEEE Transactions on Communication, January 1977.
[3] D. Bertsekas and R. Gallager, Data Networks, Prentice-Hall, 1992.
[4] G. Choudhury and S. Rappaport, "Diversity ALOHA—A Random Access Scheme for Satellite Communications," IEEE Transactions on Communications, 1983.
[5] Y. Chu et al., "ALOHA and Q-Learning based Medium Access Control for Wireless Sensor Networks," Proc. IEEE ISWCS '12, 2012.
[6] C. Fullmer and J. J. Garcia-Luna-Aceves, "Solutions to Hidden Terminal Problems in Wireless Networks," Proc. ACM SIGCOMM '97, September 1997.
[7] S. Ghez et al., "Stability Properties of Slotted ALOHA with Multipacket Reception Capability, IEEE Transactions on Automatic Control, 1988.
[8] M. Heusse et al., "Idle Sense: An Optimal Access Method for High Throughput and Fairness in Rate Diverse Wireless LANs," Proc. ACM SIGCOMM '05, 2005.
[9] P. Karn, "MACA—A New Channel Access Method for Packet Radio," Proc. ARRL/CRRL Amateur Radio 9th Computer Networking Conference, 1990.
[10] G. Liva, "Graph-based Analysis and Optimization of Contention Resolution Diversity Slotted ALOHA," IEEE Transactions on Communication, 2011.
[11] C. Kissling, "Performance Enhancements for Asynchronous Random Access Protocols over Satellite," Proc. IEEE ICC '11, June 2011.
[12] L. Kleinrock and F. A. Tobagi, "Packet Switching in Radio Channels: Part I—Carrier Sense Multiple-Access Modes and Their Throughput-Delay Characteristics," IEEE Trans. Commun., 1975.
[13] H. Okada, Y. Igarashi, and Y. Nakanishi, "Analysis and Application of Framed ALOHA Channel in Satellite Packet Switching Networks—FADRA Method," Electron. Commun. in Japan, August 1977
[14] E. Paolini, G. Liva, and M. Chiani, "High Throughput Random Access via Codes on Graphs: Coded Slotted ALOHA," Proc. IEEE ICC '11, June. 2011.
[15] L. G. Roberts, "ALOHA Packet System with and without Slots and Capture," ACM SIGCOMM CCR, Volume 5 Issue 2, April 1975.
[16] R. Rom and M. Sidi, Multiple Access Protocols Performance and Analysis, Springer-Verlag, 1990.
[17] F. C. Schoute, "Dynamic Frame Length ALOHA," IEEE Transactions on Communications, 1983.
[18] K. Sohraby et al., "Comments on Throughput Analysis for Persistent CSMA systems, IEEE Trans. Commun. January 1987.
[19] Y. Yan et al., "Adaptation of the ALOHA-Q Protocol to Multi-Hop Wireless Sensor Networks," Proc. IEEE European Wireless '14, May 2014.

What is claimed is:

1. A method for transmitting data packets on a shared channel in a data communications network, the method comprising:
   determining a time slot interval, T, based on a longest data packet to be transmitted on a shared channel in a data communications network;
   determining at a first node in the data communications network a local base time, t₀, equal to a time at an end of receipt of a successful acknowledgement control packet on the shared channel;
   transmitting a local data packet from the first node onto the shared channel at a transmit time that is an integer multiple n of T after the local base time $t_0$; and
   determining that the local data packet was successfully transmitted when a successful acknowledgement control packet that uniquely indicates the local data packet is received on the shared channel within the interval T of transmitting the local data packet.

2. The method as recited in claim 1, wherein the local data packet is transmitted or not at a current multiple i of T after the local base time $t_0$ based on a persistence probability $\varphi$.

3. The method as recited in claim 2, wherein the persistence probability $\varphi$ is based at least in part on first data in a channel utilization field in a layer 2 header received from a different second node in the data communications network.

4. The method as recited in claim 3, further comprising:
   determining an integer multiple $v_s$ of T after the local base time $t_0$ for which the local data packet is successfully transmitted; and
   inserting, into the channel utilization field in the layer 2 header for a different next local data packet, second data based at least in part on $v_s$.

5. The method as recited in claim 4, wherein the second data is also based at least in part on the first data.

6. The method as recited in claim 3, wherein the channel utilization field is one bit in length.

7. A non-transitory computer-readable medium carrying one or more sequences of instructions, wherein execution of the one or more sequences of instructions by one or more processors causes the one or more processors to perform the steps of:
- determining a time slot interval, T, based on a longest data packet to be transmitted on a shared channel in a data communications network;
- determining at a first node in the data communications network a local base time, $t_0$, equal to a time at an end of receipt of a successful acknowledgement control packet on the shared channel;
- causing a local data packet from the first node to be transmitted onto the shared channel at a transmit time that is an integer multiple n of T after the local base time to; and
- determining that the local data packet was successfully transmitted when a successful acknowledgement control packet that uniquely indicates the local data packet is received on the shared channel within the interval T of transmitting the local data packet.

8. The non-transitory computer-readable medium as recited in claim 7, wherein the local data packet is transmitted or not at a current multiple i of T after the local base time $t_0$ based on a persistence probability $\varphi$.

9. The non-transitory computer-readable medium as recited in claim 8, wherein the persistence probability $\varphi$ is based at least in part on first data in a channel utilization field in a layer 2 header received from a different second node in the data communications network.

10. The non-transitory computer-readable medium as recited in claim 9, wherein the one or more sequences of instructions further causes the one or more processors to perform the steps of:
- determining an integer multiple $v_s$ of T after the local base time $t_0$ for which the local data packet is successfully transmitted; and
- inserting, into the channel utilization field in the layer 2 header for a different next local data packet, second data based at least in part on $v_s$.

11. The non-transitory computer-readable medium as recited in claim 10, wherein the second data is also based at least in part on the first data.

12. The non-transitory computer-readable medium as recited in claim 9, wherein the channel utilization field is one bit in length.

13. An apparatus comprising:
- at least one processor; and
- at least one memory including one or more sequences of instructions,
- the at least one memory and the one or more sequences of instructions configured to, with the at least one processor, cause the apparatus to perform at least the following,
  - determining a time slot interval, T, based on a longest data packet to be transmitted on a shared channel in a data communications network;
  - determining a local base time, to, equal to a time at an end of receipt of a successful acknowledgement control packet on the shared channel;
  - causing a local data packet from the first node to be transmitted onto the shared channel at a transmit time that is an integer multiple n of T after the local base time to; and
  - determining that the local data packet was successfully transmitted when a successful acknowledgement control packet that uniquely indicates the local data packet is received on the shared channel within the interval T of transmitting the local data packet.

14. The apparatus as recited in claim 13, wherein the local data packet is transmitted or not at a current multiple i of T after the local base time $t_0$ based on a persistence probability $\varphi$.

15. The apparatus as recited in claim 14, wherein the persistence probability $\varphi$ is based at least in part on first data in a channel utilization field in a layer 2 header received from a different second node in the data communications network.

16. The apparatus as recited in claim 15, wherein the one or more sequences of instructions further causes the processor to perform the steps of:
- determining an integer multiple $v_s$ of T after the local base time $t_0$ for which the local data packet is successfully transmitted; and
- inserting, into the channel utilization field in the layer 2 header for a different next local data packet, second data based at least in part on $v_s$.

17. The apparatus as recited in claim 10, wherein the second data is also based at least in part on the first data.

18. The non-transitory computer-readable medium as recited in claim 15, wherein the channel utilization field is one bit in length.

19. A non-transitory computer-readable medium carrying one or more headers for a data packet configured for transmission over a shared channel in a data communications network, wherein a layer 2 data header includes a channel utilization field that holds data that indicates congestion perceived by a first node on the data communications network, and wherein the channel utilization field holds data based on an integer multiple $v_s$ of a time slot interval, T, after a base time $t_0$ for which a data packet from the first node is successfully transmitted.

* * * * *